(12) United States Patent
Yokoyama et al.

(10) Patent No.: US 7,123,405 B2
(45) Date of Patent: Oct. 17, 2006

(54) OPTICAL AMPLIFYING AND RELAYING SYSTEM

(75) Inventors: Ryu Yokoyama, Tokyo (JP); Takaaki Ogata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/779,672

(22) Filed: Feb. 18, 2004

(65) Prior Publication Data

US 2004/0161244 A1    Aug. 19, 2004

Related U.S. Application Data

(62) Division of application No. 10/098,308, filed on Mar. 18, 2002, now Pat. No. 6,868,204.

(30) Foreign Application Priority Data

Mar. 19, 2001    (JP)    ............................. 2001-078308

(51) Int. Cl.
*H01S 3/00* (2006.01)
*H04B 10/08* (2006.01)
(52) U.S. Cl. ...................... 359/341.2; 398/37; 398/177
(58) Field of Classification Search ............ 359/341.2; 385/27, 24, 140; 398/18, 37, 177
See application file for complete search history.

(56) References Cited

U.S. PATENT DOCUMENTS

| 5,392,153 A | 2/1995 | Delavaux |
| 5,737,105 A * | 4/1998 | Ohta et al. ..................... 398/18 |
| 6,549,315 B1 | 4/2003 | Kakui |
| 6,868,204 B1 * | 3/2005 | Yokoyama et al. ........... 385/27 |

FOREIGN PATENT DOCUMENTS

| EP | 0 777 145 A2 | 6/1997 |
| EP | 0 981 215 A2 | 2/2000 |
| EP | 0981215 A2 * | 2/2000 |
| EP | 1 049 274 A2 | 11/2000 |
| EP | 1 050 982 A1 | 11/2000 |
| JP | 02-002228 | 1/1990 |
| JP | 09-116502 | 5/1997 |
| JP | 09-153862 | 6/1997 |
| JP | 11-266205 | 9/1999 |
| JP | 2000-59306 | 2/2000 |
| JP | 3055452 | 4/2000 |

OTHER PUBLICATIONS

European Search Report dated Aug. 8, 2003.
Japanese Office Action dated May 18, 2004.
English translation of portion of Japanese Office Action dated May 18, 2004.

* cited by examiner

*Primary Examiner*—Mark Hellner
(74) *Attorney, Agent, or Firm*—McGinn IP Law Group, PLLC

(57) ABSTRACT

An optical amplifying and relaying system capable of easily and highly accurately monitor troubles in optical amplifiers provided in an up and a down optical fiber transmission line opposing each other is disclosed. Monitoring light signal folding-back lines including variable optical attenuators 4a and 4b and wavelength selective reflecting means 5a and 5b, respectively, are provided between optical transmission lines L1 and L2, which oppose each other and on which optical amplifiers 4a and 4b are disposed each other.

15 Claims, 18 Drawing Sheets

OPTICAL AMPLIFYING AND RELAYING SYSTEM

The present Application is a Divisional Application of U.S. patent application Ser. No.10/098,308 filed on Mar. 18, 2002.

This application claims benefit of Japanese Patent Application No. 2001-078308 filed on Mar. 19, 2001, the contents of which are incorporated by the reference.

BACKGROUND OF THE INVENTION

The present invention relates to optical amplifying and relaying systems and, more particularly, to optical amplifying and relaying systems for amplifying light signals in optical fiber transmission lines or the like and also monitoring the transmission line state.

The optical communication utilizing optical fibers has various merits compared to conventional electric communication with electric signals through the copper wire. Particularly, the optical communication can be adopted for high rate and large capacity communication and is excellent in anti-noise characteristics against electromagnetic noise or the like. In the optical communication, coherent light beams such as laser beams are transmitted on very thin optical fiber cables. Although the optical fiber cable has low optical attenuation characteristic and permits long distance transmission, in order to maintain the signal quality the light signal is amplified by optical amplifier/relays provided at a predetermined interval. Prior art techniques in such technical field are disclosed in Japanese Patent Laid-Open No. 9-116502 entitled "High Output Optical Amplifier/Relay having monitoring Loop-Back Circuit", Japanese Patent Laid-open No. 9-153862 entitled "Monitoring Method in Optical Amplifying/Relaying Transmission System" and Japanese Patent Laid-Open No. 2000-59306 entitled "Optical Amplifier/Relay" and so forth.

FIG. 17 is a block diagram showing the structure of a prior art optical amplifier/relay (or optical amplifying and relaying system). This optical amplifier/relay 1 comprises a first and a second optical amplifier 2a and 2b, a first (optical) coupler 3a, a second coupler 3b, a first and a second wavelength selective reflecting means 5a and 5b and a first and a second terminal part 6a and 6b. In this prior art technique, light branching/wavelength selective reflecting means connected at subsequent stages to the optical amplifiers 2a and 2b in paired optical transmission lines for transmission and reception, transmit monitoring signals to the opposite lines.

FIG. 18 is a view illustrating operation of the optical amplifier/relay shown in FIG. 17 in the case of transmitting monitoring light signals to the opposite optical transmission lines for the monitoring thereof. In this optical amplifier/relay, in the optical transmission line a monitoring light signal (λsv) and a main light signal (λ1 to λ4) are inputted to the optical amplifier 2a and transmitted via subsequent stage optical branching function constituted by the first optical coupler 3a, the wavelength selective reflecting means 5a and the second coupler 3b to the opposite optical transmission line, and monitoring light signal(λsv) and the reflectivity of the optical grating are obtained on the opposite optical transmission line side.

In this optical amplifier/relay, the light intensity variation in the optical amplifier in each line and the light intensity variation of the monitoring light signal transmitted to the opposite line are equal. In this case, a problem arises in the event of a trouble occurred in the optical amplifier, the output of which is subject to very little variation, that the trouble can not be recognized or that the recognition requires long time. Also, the monitoring light signal folded back to the opposite line permits obtaining only data concerning the output level of the optical amplifier.

SUMMARY OF THE INVENTION

An object of the present invention, accordingly, is to provide a high accuracy optical amplifying and relaying system capable of solving or alleviating the above problem inherent in the prior art.

According to a first aspect of the present invention, there is provided an optical amplifying and relaying system comprising an up and a down optical transmission line opposing each other, amplifiers each provided on each of the optical transmission lines, and monitoring light signal folding-back lines connected between the two optical transmission lines and each including an optical coupler for taking out a monitoring light signal led to the own optical transmission line and a wavelength selective reflecting means for transmitting the monitoring light signal received from the own optical transmission line by folding-back transmission to the opposite optical transmission line, wherein: the optical amplifying and relaying system further comprises variable optical attenuators each provided between each optical coupler and the associated wavelength selective reflecting means.

The optical couplers are each provided on the optical transmission line in the output side of each optical amplifier. The optical couplers are each provided on the optical transmission line on the input side of each optical amplifier. Wavelength selective reflecting means are provided two on opposites of each of the variable optical attenuators, the two wavelength selective reflecting means being operative to reflect light signals of different wavelengths for transmission to the opposite optical transmission line. The monitoring light signal folding-back lines each include a pair of lines for transmitting a light signal from the output side of the optical amplifier on the own optical transmission line to the input side of the optical amplifier on the opposite optical transmission line. A light signal led to each monitoring light signal folding-back line is transmitted via a separate optical coupler and wavelength selective reflecting means of different wavelengths to the opposite optical transmission line.

According to a second aspect of the present invention, there is provided an optical amplifying and relaying system comprising an up and a down optical transmission line opposing each other, amplifiers each provided on each of the optical transmission lines, and monitoring light signal folding-back lines connected between the two optical transmission lines and each including an optical coupler for taking out a monitoring light signal led to the own optical transmission line and a wavelength selective reflecting means for transmitting the monitoring light signal received from the own optical transmission line by folding-back transmission to the opposite optical transmission line, wherein variable optical attenuators are each provided between each optical coupler and the associated wavelength selective reflecting means, the monitoring light signal branched and reflected by the optical coupler on each optical transmission line being transmitted via the optical coupler on the opposite optical transmission line to the optical amplifier output side thereof.

According to a third aspect of the present invention, there is provided an optical amplifying and relaying system comprising an up and a down optical transmission line opposing each other, amplifiers each provided on each of the optical transmission lines, and monitoring light signal folding-back lines connected between the two optical transmission lines and each including an optical coupler for taking out a monitoring light signal led to the own optical transmission line and a wavelength selective reflecting means for transmitting the monitoring light signal received from the own optical transmission line by folding-back transmission to the opposite optical transmission line, wherein variable optical attenuators are each provided between each optical coupler and the associated wavelength selective reflecting means, the monitoring light signal folding-back lines are each provided on the input side of the optical amplifier on the own optical transmission line.

According to a fourth aspect of the present invention, there is provided an optical amplifying and relaying system comprising an up and a down optical transmission line opposing each other, amplifiers each provided on each of the optical transmission lines, and monitoring light signal folding-back lines connected between the two optical transmission lines and each including an optical coupler for taking out a monitoring light signal led to the own optical transmission line and a wavelength selective reflecting means for transmitting the monitoring light signal received from the own optical transmission line by folding-back transmission to the opposite optical transmission line, wherein variable optical attenuators are each provided between each optical coupler and the associated wavelength selective reflecting means, and the monitoring light signal branched and reflected by each coupler on optical amplifier output side of the own optical transmission line is transmitted via the optical coupler and optical amplifier input side on the opposite optical transmission line to the same opposite optical transmission line.

According to a fifth aspect of the present invention, there is provided an optical amplifying and relaying system comprising an up and a down optical transmission line opposing each other, amplifiers each provided on each of the optical transmission lines, and monitoring light signal folding-back lines connected between the two optical transmission lines and each including an optical coupler for taking out a monitoring light signal led to the own optical transmission line and a wavelength selective reflecting means for transmitting the monitoring light signal received from the own optical transmission line by folding-back transmission to the opposite optical transmission line, wherein variable optical attenuators are each provided between each optical coupler and the associated wavelength selective reflecting means, and optical couplers are provided on the output and input sides of each optical amplifier, and the branched and reflected monitoring light signals on each optical transmission line side are transmitted via the output and input sides, respectively, of the optical amplifier on the opposite optical transmission line to the same opposite optical transmission line.

According to a sixth aspect of the present invention, there is provided an optical amplifying and relaying system comprising an up and a down optical transmission line opposing each other, amplifiers each provided on each of the optical transmission lines, and monitoring light signal folding-back lines connected between the two optical transmission lines and each including an optical coupler for taking out a monitoring light signal led to the own optical transmission line and a wavelength selective reflecting means for transmitting the monitoring light signal received from the own optical transmission line by folding-back transmission to the opposite optical transmission line, wherein variable optical attenuators are each provided between each optical coupler and the associated wavelength selective reflecting means, and on each optical transmission line a monitoring light signal branched and reflected by an optical amplifier output side optical coupler via an optical coupler and the optical amplifier input side on the opposite transmission line to the same opposite optical transmission line, while a monitoring light signal branched and reflected by an optical amplifier output side on the opposite optical transmission line to the same opposite optical transmission line.

According to a seventh aspect of the present invention, there is provided an optical amplifying and relaying system comprising an up and a down optical transmission line opposing each other, amplifiers each provided on each of the optical transmission lines, and monitoring light signal folding-back lines connected between the two optical transmission lines and each including an optical coupler for taking out a monitoring light signal led to the own optical transmission line and a wavelength selective reflecting means for transmitting the monitoring light signal received from the own optical transmission line by folding-back transmission to the opposite optical transmission line, wherein variable optical attenuators are each provided between each optical coupler and the associated wavelength selective reflecting means, and on each optical transmission line the light signal led to the monitoring light signal folding-back line is branched by a separate optical coupler, then reflected by a plurality of wavelength selective reflecting means of different wavelengths and then transmitted to the opposite optical transmission line.

Wavelength selective reflecting means is provided preceding to and subsequent to the variable optical attenuator. An optical isolator is provided as an intermediate stage in each monitoring light signal folding-back line, and each wavelength selective reflecting means uses an optical fiber grating.

Other objects and features will be clarified from the following description with reference to attached drawings.

PREFERRED EMBODIMENTS OF THE INVENTION

Figure 1:
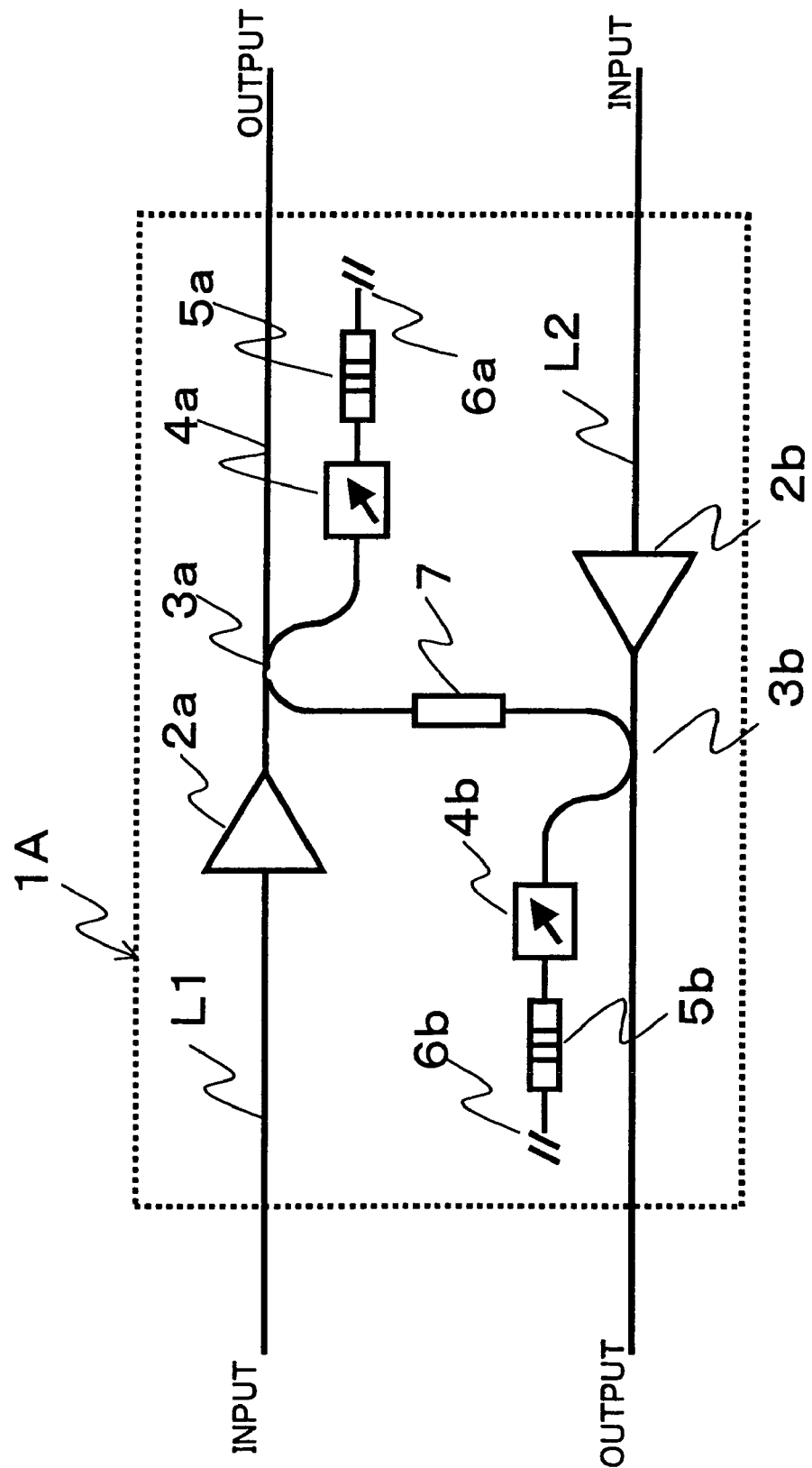
FIG. 1 is a block diagram showing the structure of a first embodiment of the optical amplifying and relaying system according to the present invention.

Preferred embodiments of the present invention will now be described with reference to the drawings. For the sake of the brevity, elements corresponding to those in the prior art described above are designated by like reference numerals.

FIG. 1 is a block diagram showing the structure of a first embodiment of the optical amplifying and relaying system according to the present invention. The illustrated first embodiment of the optical amplifying and relaying system 1A includes two (or a pair of) optical amplifiers, i.e., an up and down line optical amplifiers 2a and 2b corresponding to an up and a down optical fiber transmission lines L1 and L2, respectively. As stages subsequent to the two optical amplifiers 2a and 2b are provided optical couplers (or optical branchers) 3a and 3b, variable optical attenuators 4a and 4b, wavelength selective reflecting means 5a and 5b, terminal parts 6a and 6b and a fixed attenuator 7. In this specification, by the term "optical coupler" is generally referred to as an optical function element having a function of branching and combining light. The fixed attenuator 7 is not essential.

The optical couplers 3a and 3b each branch a main and a monitoring output light signal. The variable optical attenuators 4a and 4b adjust the light intensity levels of the light signals branched by the optical couplers 3a and 3b. The wavelength selective reflecting means 5a and 5b transmit (pass) only the main light signals outputted from the variable optical attenuators 4a and 4b and reflect only the monitoring light signals therefrom. The monitoring light signals reflected by the wavelength selective reflecting means 5a and 5b pass through the variable optical attenuators 4a and 4b again, thence pass through the fixed attenuator 7 and thence fed out via the output side optical couplers 3b and 3a and optical amplifiers 2b and 2a, respectively, to the opposite optical fiber transmission lines L2 and L1.

Figure 15:
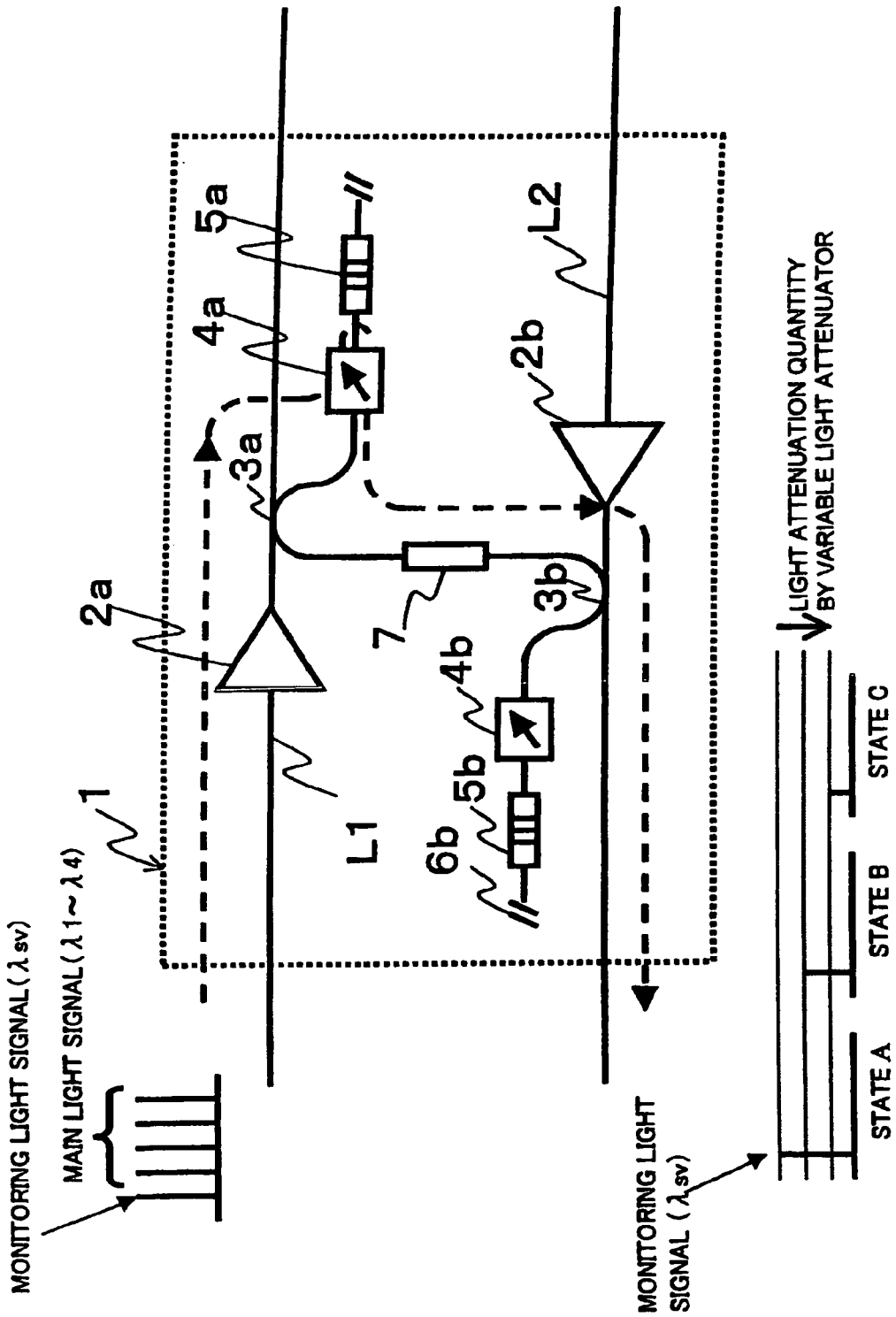
FIG. 15 shows the operation of transmission of the monitoring light signals in the optical amplifying and relaying system according to the present invention to the opposite lines.

FIG. 15 shows the operation of transmission of the monitoring light signals ($\lambda$sv) in the optical amplifying and relaying system 1A according to the present invention to the opposite lines. The optical coupler 3a branches part of the main and monitoring light signals ($\lambda$1 to $\lambda$4) and ($\lambda$sv) outputted from the optical amplifier 2a from the opposite optical fiber transmission line. The main and monitoring light signals ($\lambda$1 to $\lambda$4) and ($\lambda$sv) branched by the optical coupler 3a pass through the variable optical attenuator 4a and fed to the wavelength selective reflecting means 5a, which transmits only the main light signal ($\lambda$1 to $\lambda$4) and reflects only the monitoring light signal ($\lambda$sv). The monitoring light signal ($\lambda$sv) reflected by the wavelength selective reflecting means 5a passes through the variable optical attenuator 4a again, and fed out by the optical coupler 3b provided on the output side of the opposite optical amplifier 2b to the opposite optical fiber transmission line. The attenuation level of the variable optical attenuator 4a (which prescribes the level of the monitoring light signal fed out to the opposite optical fiber transmission line) is a predetermined according to the state of the optical amplifier 2a (for instance, large when the number of troubles in an excited laser diode is increased or when the optical amplifier input level is reduced), and it is possible to determine the state of the optical amplifying and relaying system 1A in an optical amplifying and relaying system monitor (not shown) installed in a terminal station.

Figure 16:
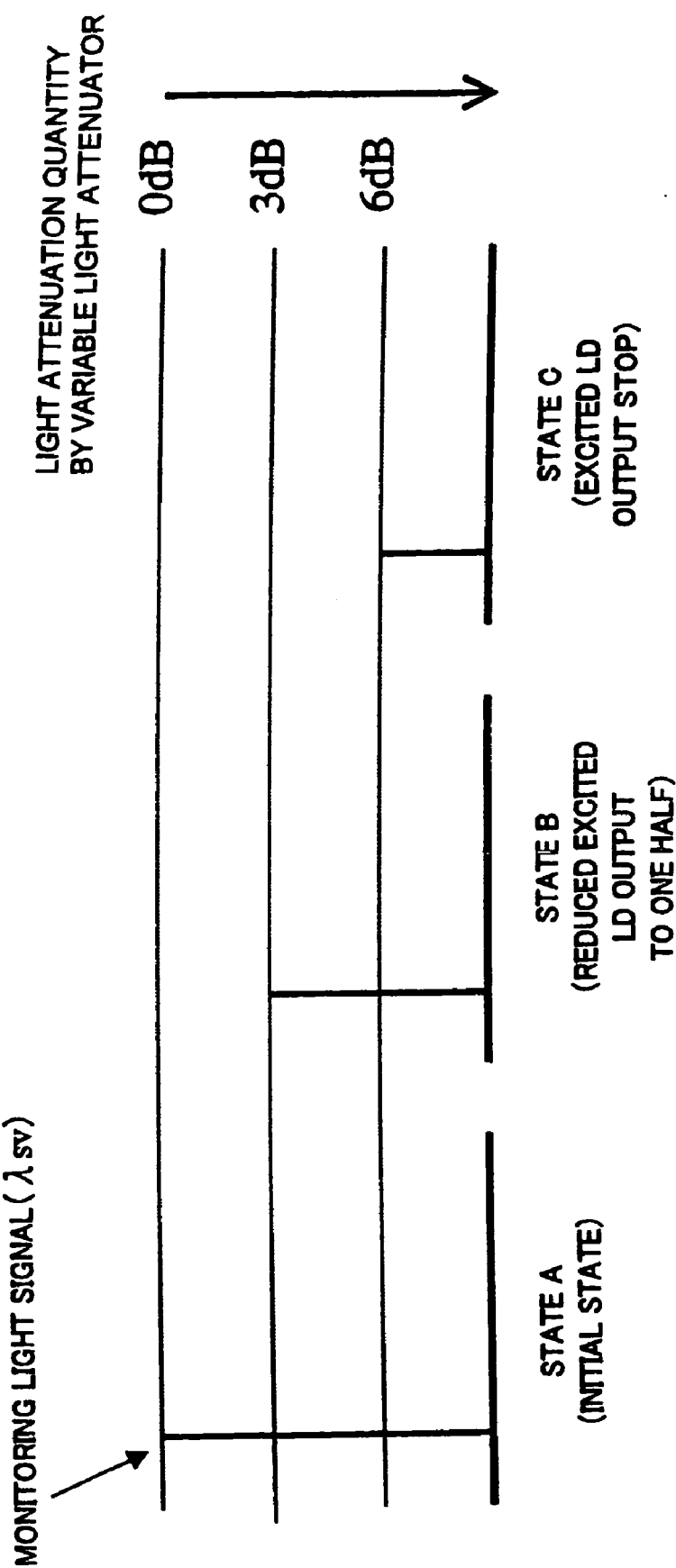
FIG. 16 shows an example of the level characteristic of the monitoring light signals folded back to the opposite lines in the optical amplifying and relaying system according to the present invention.
Figure 17:
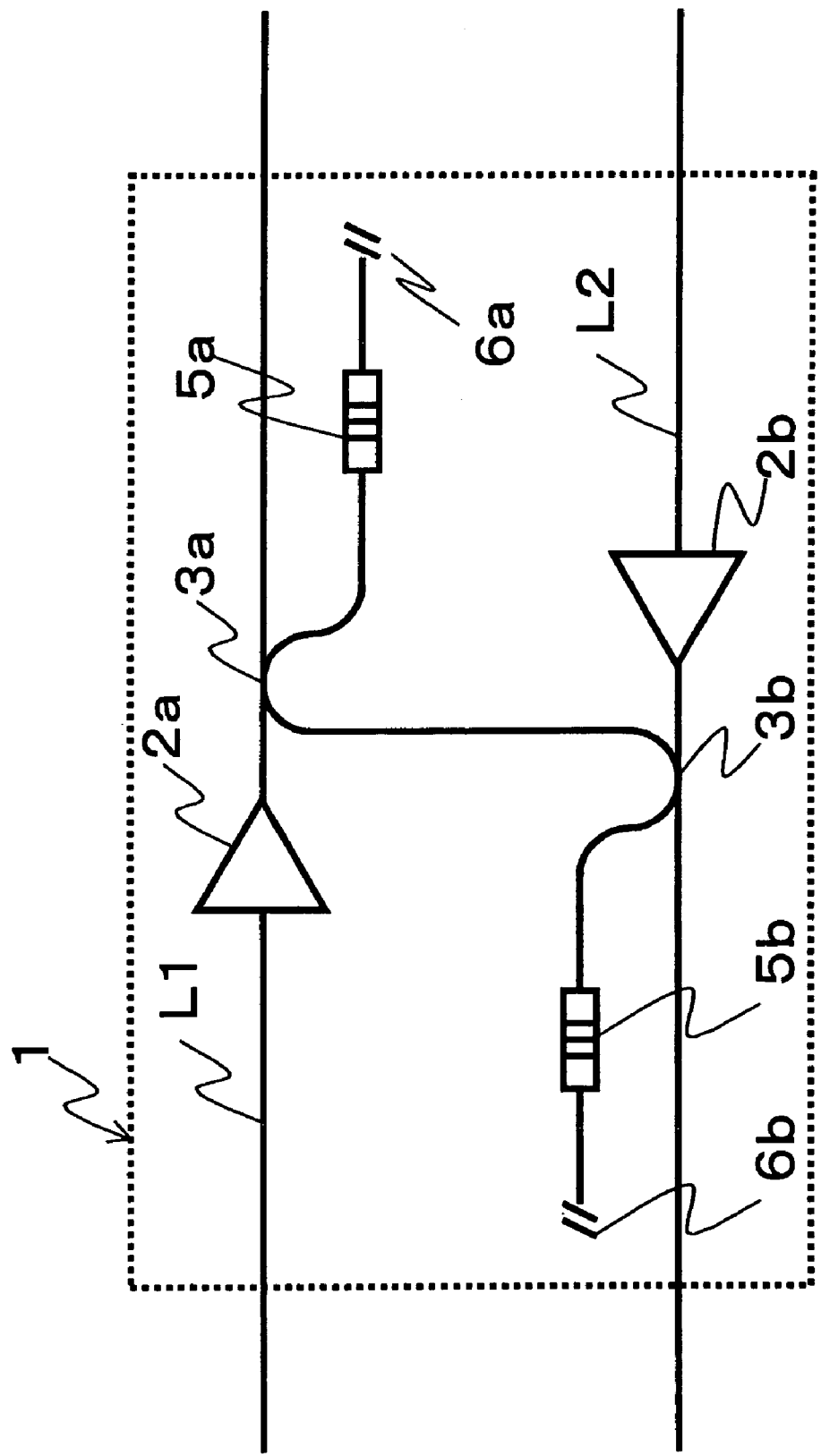
FIG. 17 is a block diagram showing the structure of a prior art optical amplifier/relay (or optical amplifying and relaying system)
Figure 18:
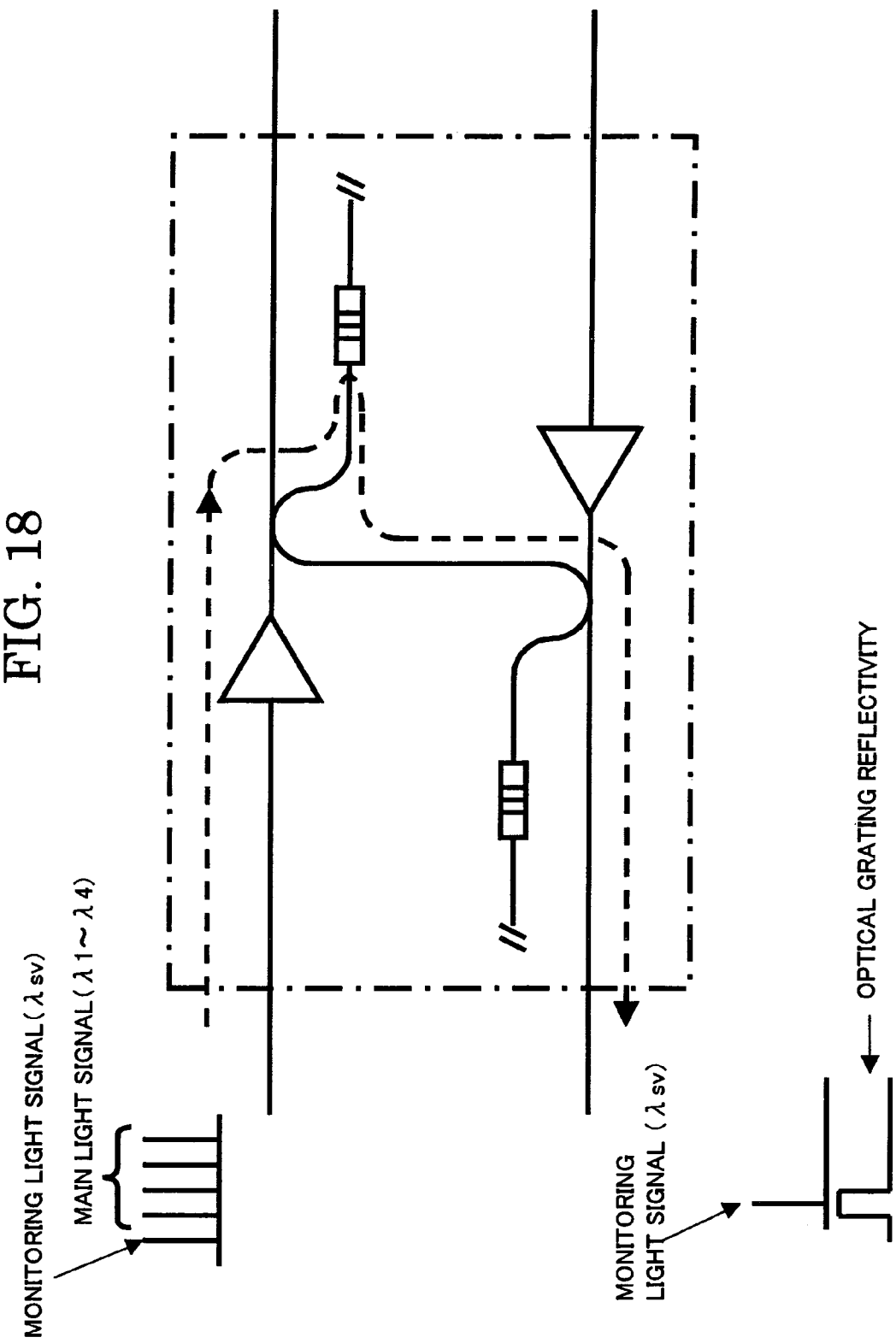
FIG. 18 is a view illustrating operation of the optical amplifier/relay shown in FIG. 17.

FIG. 16 shows an example of the level characteristic of the monitoring light signals folded back to the opposite lines when setting the attenuation level of the variable optical attenuators 4a and 4b based on the output state of the exciting laser diode LD in the optical amplifying and relaying system 1A shown in FIG. 1. State A shows the optical attenuation level and the monitoring light signal level of the variable optical attenuator 4a when the output level of the exciting LD is a rated level. In this state, the attenuation level of the monitoring light signal is 0 dB, and the level thereto is an initial level. State B shows the optical attenuation level and the monitoring light signal level of the variable optical attenuator 4a when the output level of the exciting LD is reduced to one half. In this state, the attenuation level of the monitoring light signal is –3 dB with respect to the initial level. State C shows the optical attenuation level and the monitoring light signal level of the variable optical attenuator 4a when the output of the exciting LD is turned off. In this state, the attenuation level of the monitoring light signal is –6 dB with respect to the initial level. The state of the exciting LD in the optical amplifying and relaying system 1A can be monitored by determining the different light signal levels with the above terminal station monitor.

Figure 2:
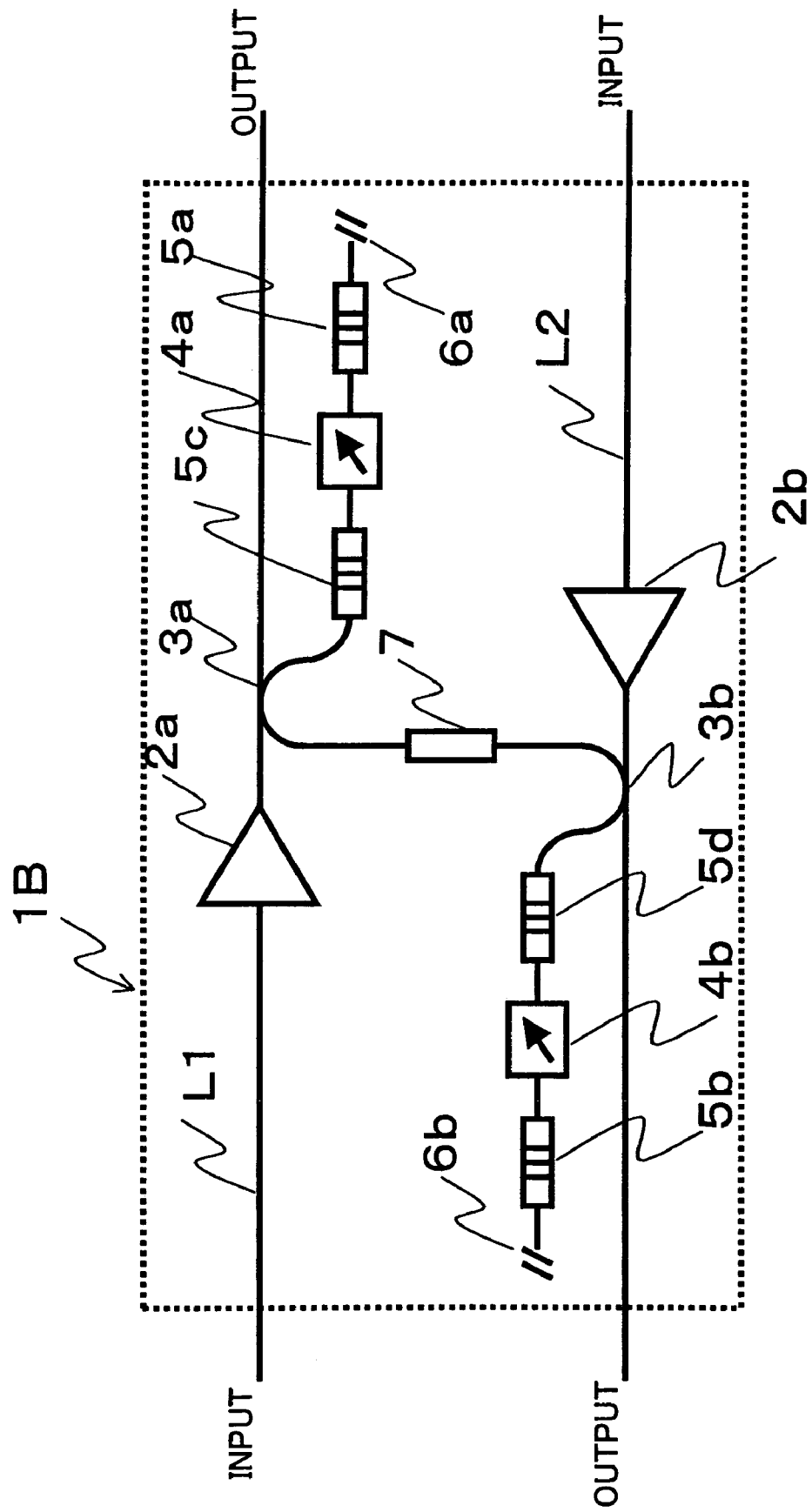
FIG. 2 is a view showing the structure of a second embodiment of the optical amplifying and relaying system according to the present invention.

FIG. 2 is a view showing the structure of a second embodiment of the optical amplifying and relaying system according to the present invention. The second embodiment of the optical amplifying and relaying system 1B comprises, in addition to all the elements in the first embodiment shown in FIG. 1, wavelength selective reflecting means 5a and 5c, and 5b and 5d provided preceding to and succeeding to the variable optical attenuators 4a and 4b, respectively. The two pairs of wavelength selective reflecting means 5a and 5c, and 5b and 5d, reflect different wavelength monitoring light signals to be transmitted to the opposite lines L2 and L1. It is possible to make highly accurate measurement of the attenuation levels of the variable optical attenuators by determining the levels of the transmitted monitoring light signals of the two different wavelengths.

Figure 3:
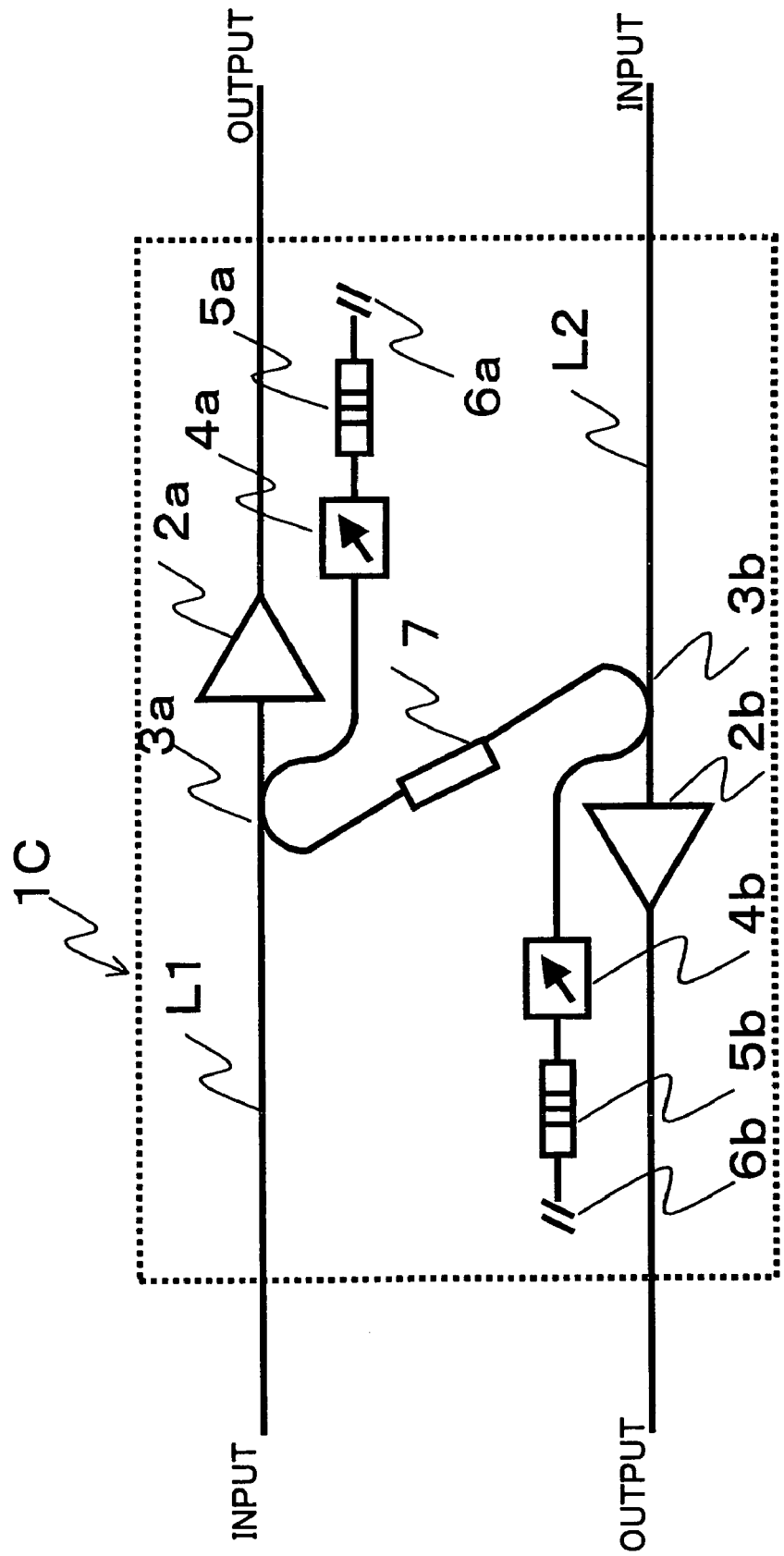
FIG. 3 is a view showing the structure of a third embodiment of the optical amplifying and relaying system according to the present invention.

FIG. 3 is a view showing the structure of a third embodiment of the optical amplifying and relaying system according to the present invention. This optical amplifying and relaying system 1C is the same in structure as the first embodiment of the optical amplifying and relaying system 1A shown in FIG. 1 except for that the monitoring light signal folding-back lines are provided not as succeeding stage (i.e., on the output side) but on the input side of the up and down optical amplifiers 2a and 2b.

Figure 4:
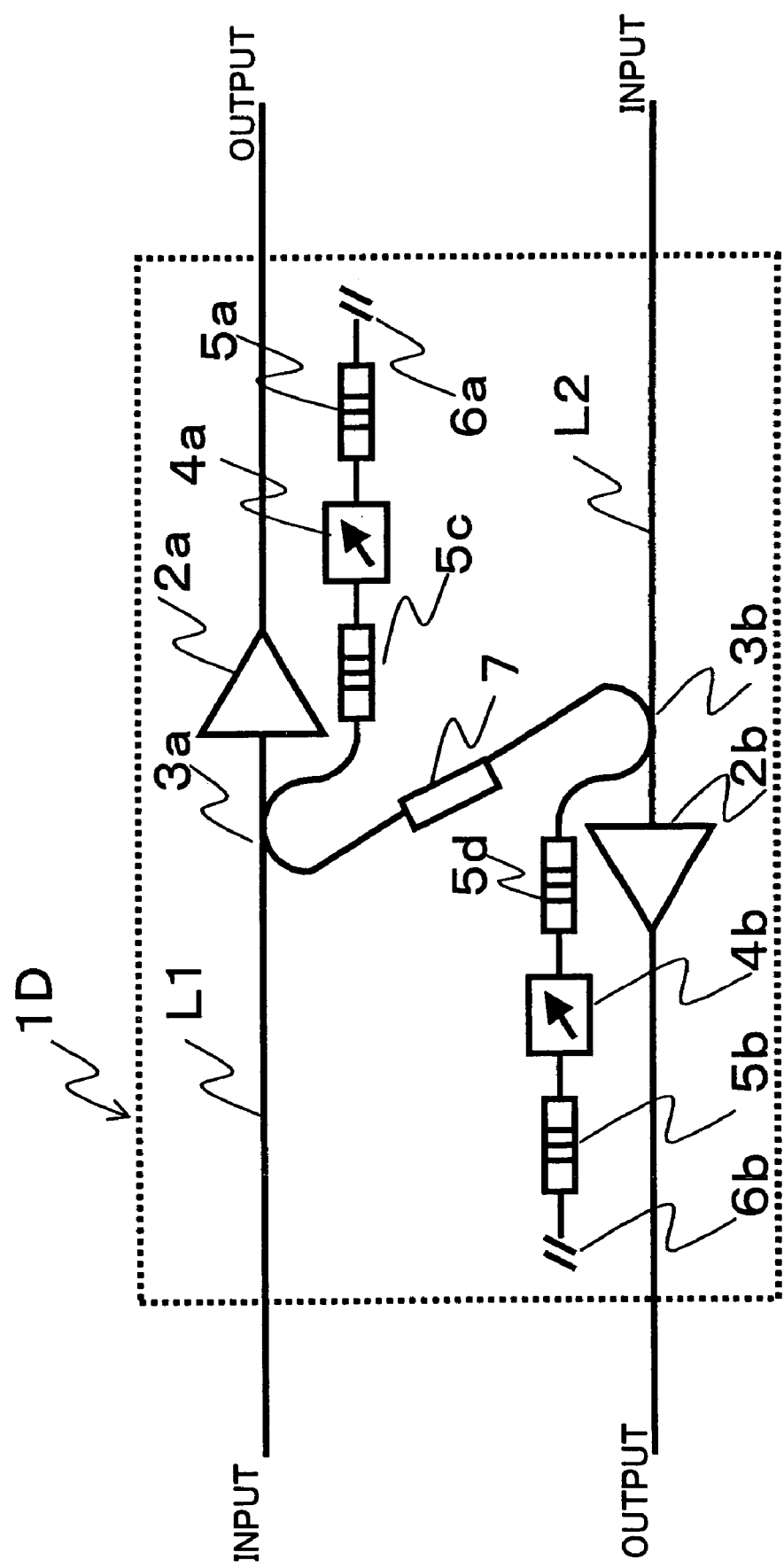
FIG. 4 is a view showing a fourth embodiment of the optical amplifying and relaying system according to the present invention.

FIG. 4 is a view showing a fourth embodiment of the optical amplifying and relaying system according to the present invention. This optical amplifying and relaying system 1D is a combination of the previous second and third embodiments of the optical amplifying and relaying systems 1B and 1C. More specifically, the monitoring light signal folding-back lines are provided in the input side of the up and down optical amplifiers 2a and 2b, respectively, and the wavelength selective reflecting means 5a and 5c and 5b and 5d are provided preceding to and succeeding to the variable optical attenuators 4a and 4b.

Figure 5:
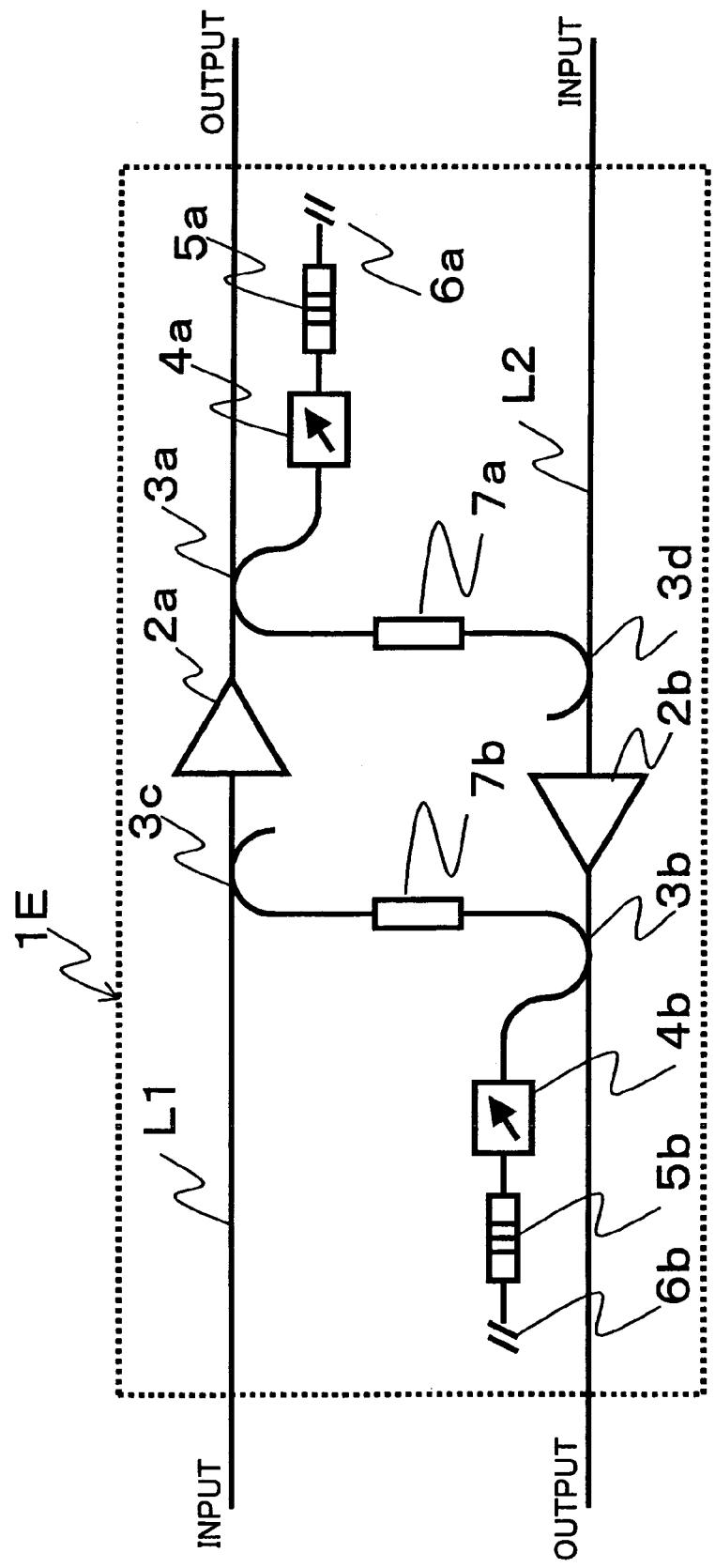
FIG. 5 is a view showing the structure of a fifth embodiment of the optical amplifying and relaying system according to the present invention.

FIG. 5 is a view showing the structure of a fifth embodiment of the optical amplifying and relaying system according to the present invention. This optical amplifying and relaying system 1E further comprises optical couplers 3d and 3c, which transmit monitoring light signals having been branched and reflected on the output side of the optical amplifiers 2a and 2b via the opposite optical amplifiers 2b and 2a to the opposite optical fiber transmission lines L2 and L1.

Figure 6:
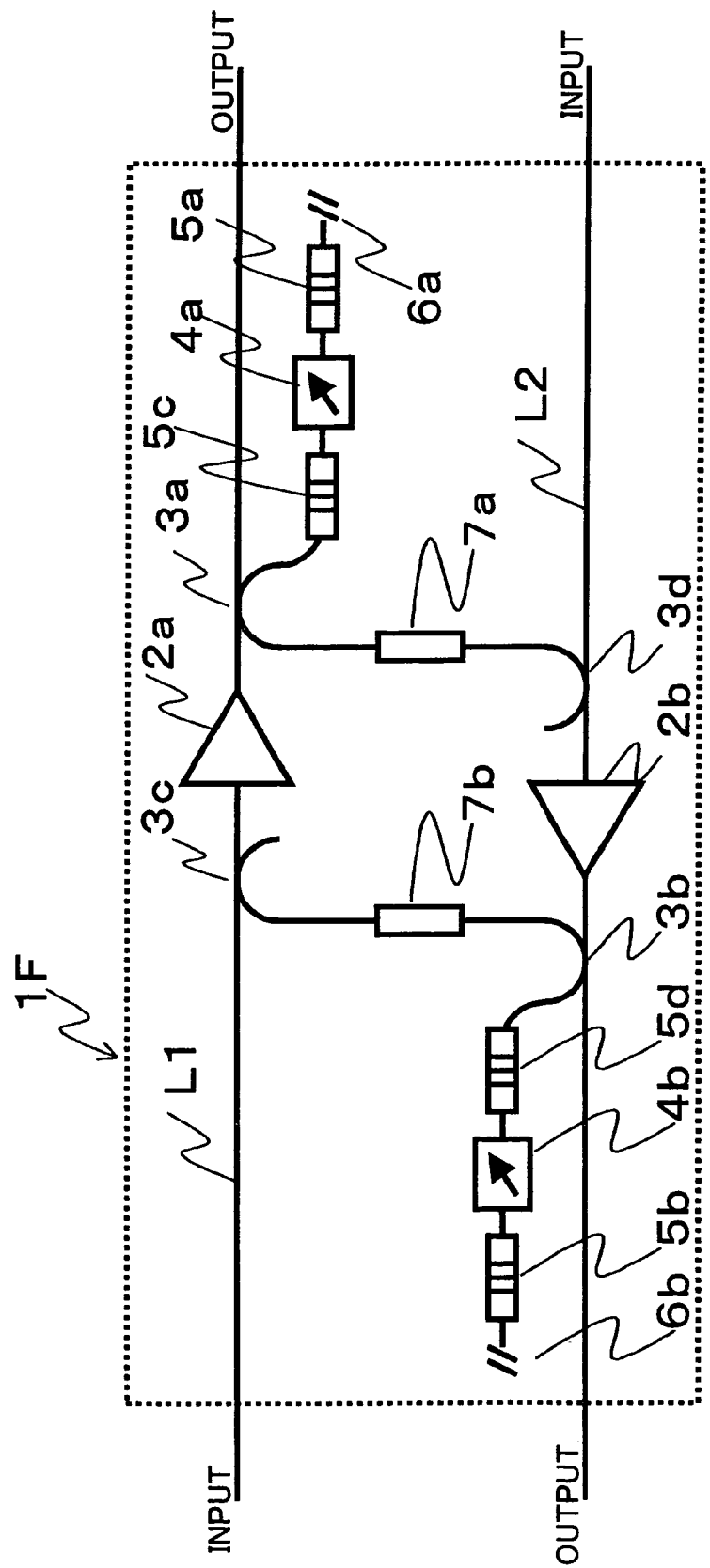
FIG. 6 is a view showing the structure of a sixth embodiment of the optical amplifying and relaying system according to the present invention.

FIG. 6 is a view showing the structure of a sixth embodiment of the optical amplifying and relaying system according to the present invention. This optical amplifying and relaying system 1F, like the optical amplifying and relaying system 1E shown in FIG. 5, further comprises optical couplers 3c and 3d, which transmit monitoring light signals having been branched and reflected on the output side of the optical amplifiers 2a and 2b via the opposite optical amplifiers 2b and 2a to the opposite optical fiber transmission lines L2 and L1. This embodiment of the system 1F, like the FIG. 2 system, further comprises wavelength selective reflecting means 5a and 5c, and 5b and 5d provided preceding to and succeeding to the variable optical attenuators 4a and 4b.

Figure 7:
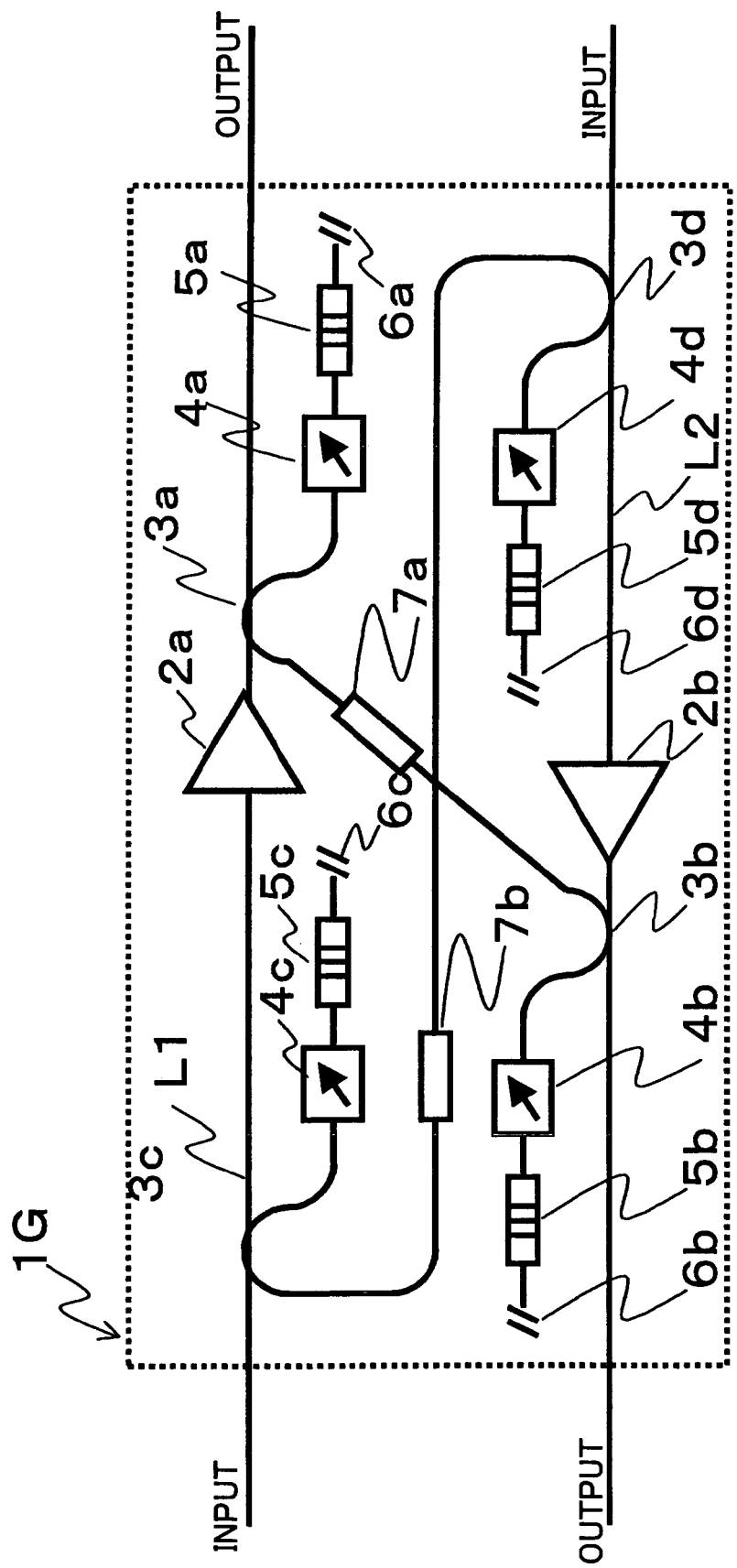
FIG. 7 is a view showing the structure of a seventh embodiment of the optical amplifying and relaying system according to the present invention.

FIG. 7 is a view showing the structure of a seventh embodiment of the optical amplifying and relaying system according to the present invention. This optical amplifying and relaying system 1G comprises optical couplers 3a and 3c, and 3b and 3d provided on the output and input sides of the optical amplifiers 2a and 2b, respectively. The branched and reflected monitoring light signals are transmitted not via and via the opposite optical amplifiers 2b and 2a to the opposite optical fiber transmission lines L2 and L1.

Figure 8:
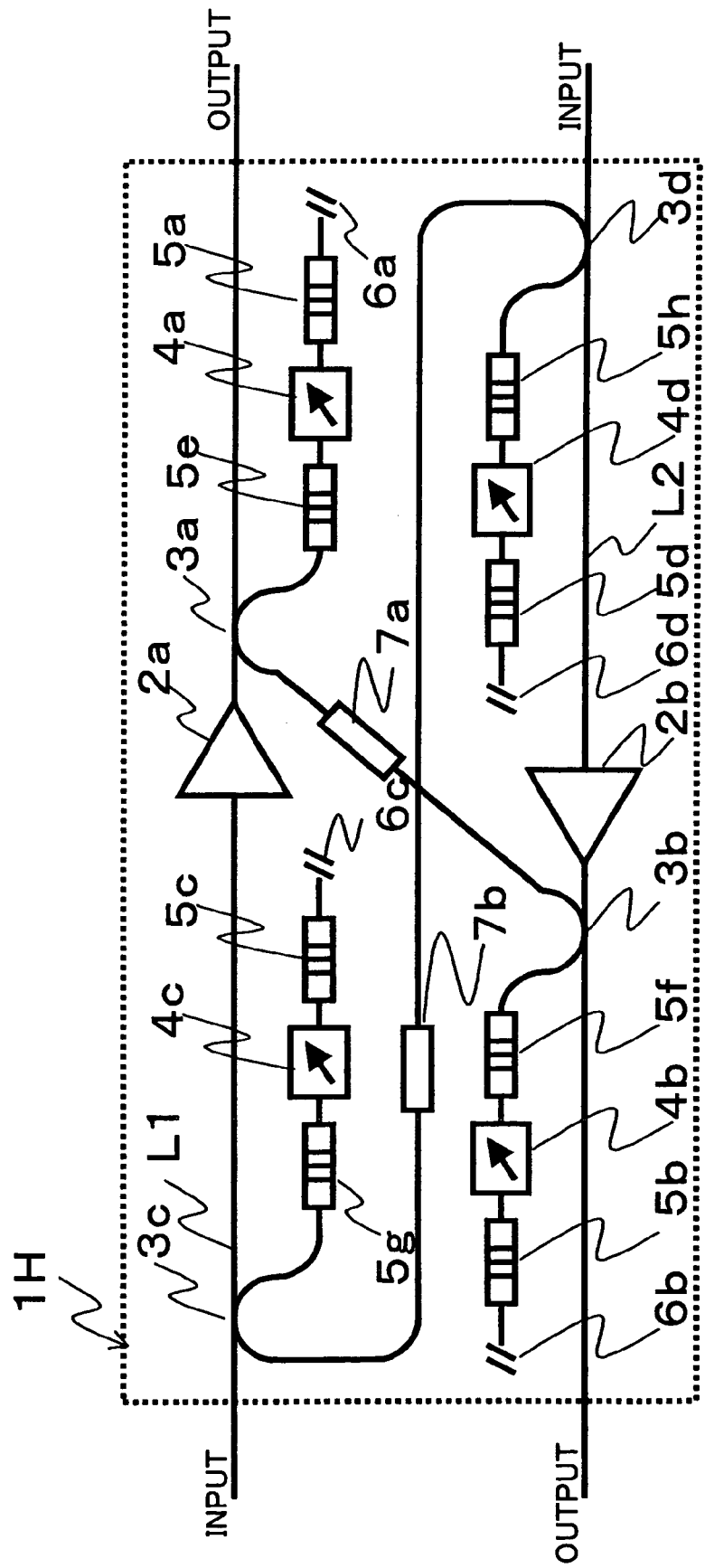
FIG. 8 is a view showing the structure of an eighth embodiment of the optical amplifying and relaying system according to the present invention.

FIG. 8 is a view showing the structure of an eighth embodiment of the optical amplifying and relaying system according to the present invention. This optical amplifying and relaying system 1H, like the optical amplifying and relaying system 1G shown in FIG. 7, comprises optical couplers 3a to 3d, which are provided on the output and input sides of the optical amplifiers 2a and 2b and transmit the branched and reflected monitoring light signals via the opposite optical amplifiers 2b and 2a to the opposite optical fiber transmission lines L2 and L1. Also, like the FIG. 2 system, this embodiment of the system 1H further comprises wavelength selective reflecting means 5a and 5e, 5b and 5f, 5a and 5g, and 5d and 5h provided preceding to and succeeding to the variable optical attenuators 4a to 4d.

Figure 9:
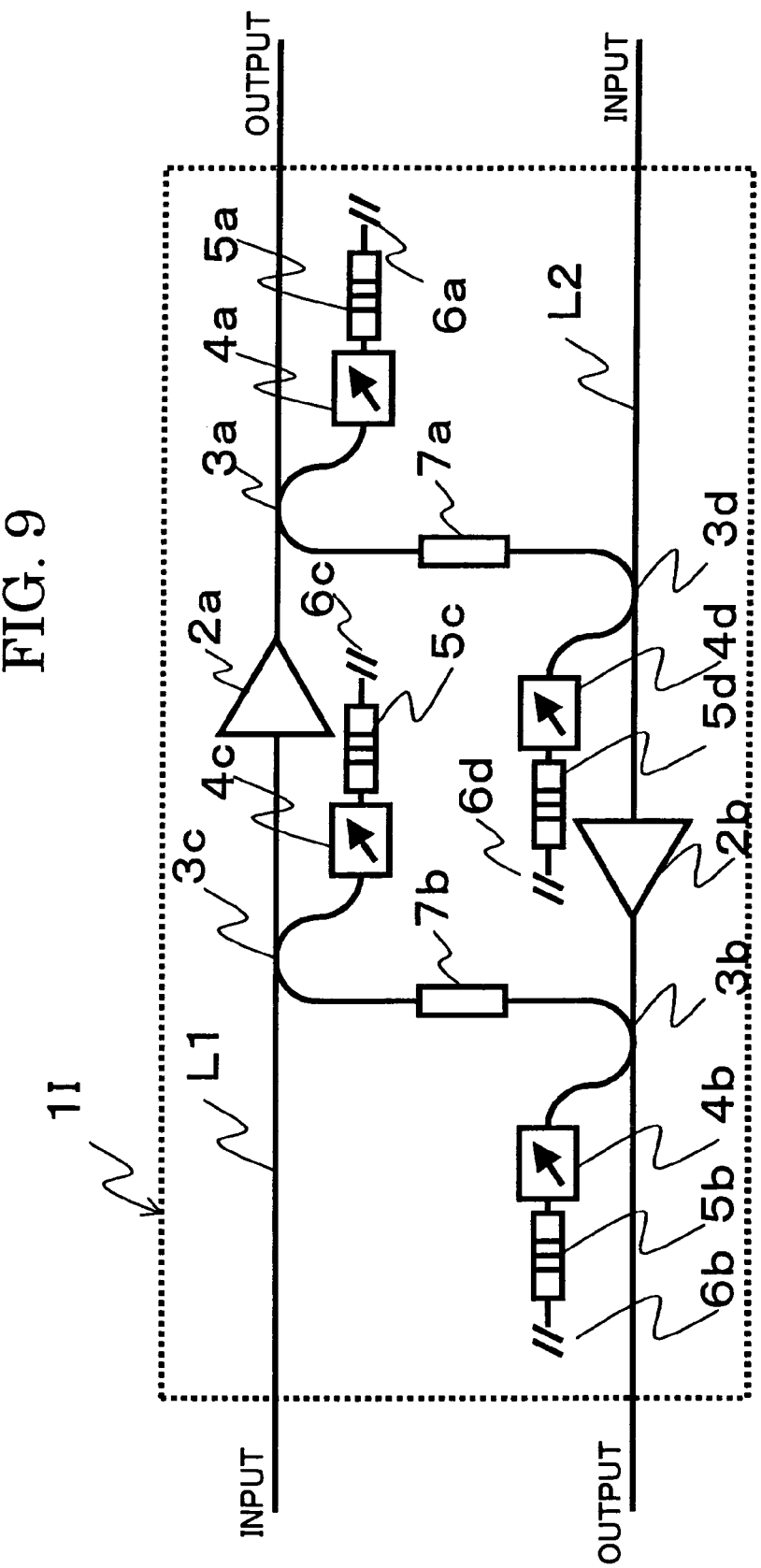
FIG. 9 is a view showing the structure of a ninth embodiment of the optical amplifying and relaying system according to the present invention.

FIG. 9 is a view showing the structure of a ninth embodiment of the optical amplifying and relaying system according to the present invention. In this optical amplifying and relaying system 1I, the monitoring light signals branched and reflected by the optical couplers (or branchers) 3a and 3b on the output side of the optical amplifiers 2a and 2b, are transmitted via optical couplers 3d and 3c to the optical amplifiers 2b and 2a on the opposite optical fiber transmission lines L2 and L1. Also, the monitoring light signals branched and reflected by optical couplers 3c and 3d on the input side of the optical amplifiers 2a and 2b are transmitted via the optical couplers 3c and 3d to the output side of the optical amplifiers 2b and 2a on the opposite optical fiber transmission lines L2 and L1.

Figure 10:
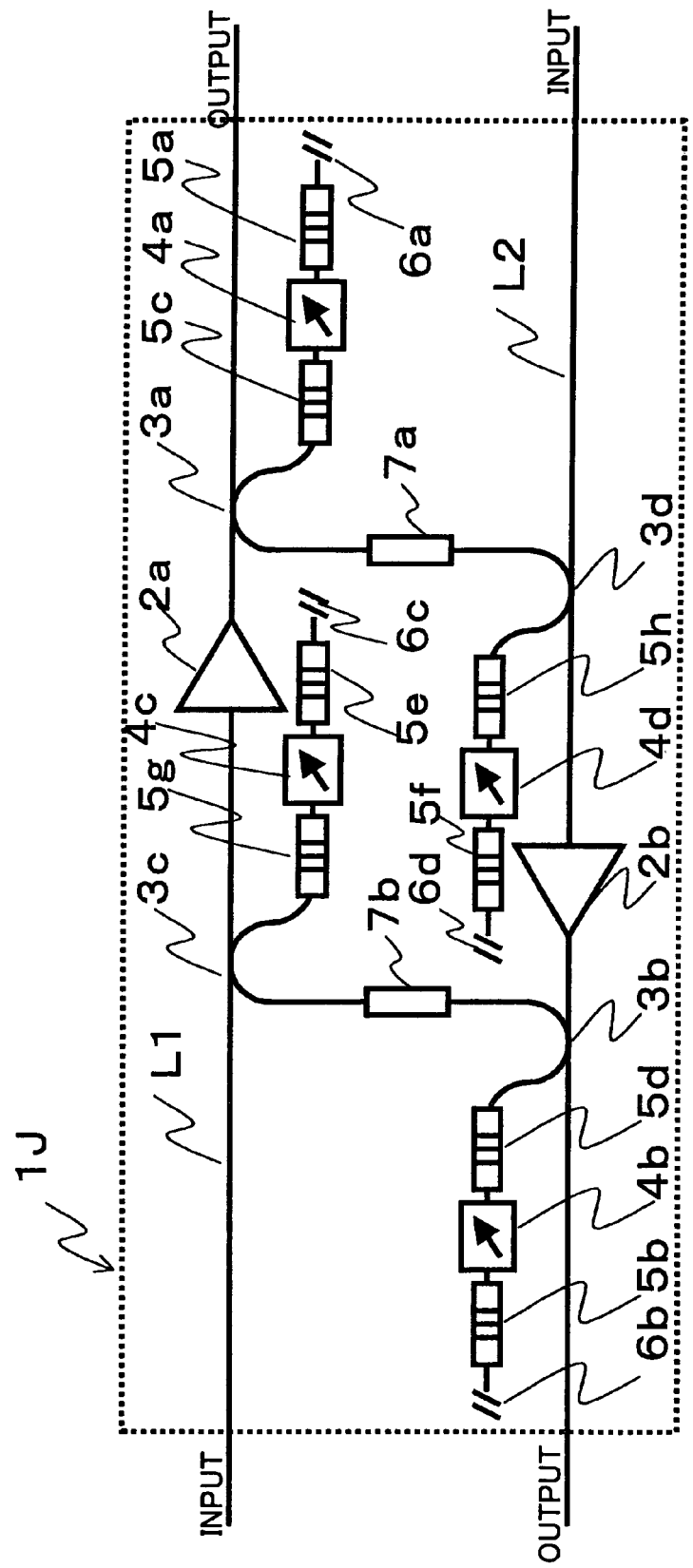
FIG. 10 is a view showing the structure of a tenth embodiment of the optical amplifying and relaying system according to the present invention.

FIG. 10 is a view showing the structure of a tenth embodiment of the optical amplifying and relaying system according to the present invention. In the optical amplifying and relaying system 1J, the monitoring light signals branched and reflected on the output side of the optical amplifiers 2a and 2b are transmitted via the opposite optical amplifiers 3d, 3c to the opposite optical fiber transmission lines, and the monitoring light signals branched and reflected on the input side of the optical amplifiers 2b and 2a are transmitted via the opposite optical amplifiers to the opposite optical fiber transmission lines L2 and L1. Also, wavelength selective reflecting means 5a and 5c, 5b and 5d, 5e and 5g, and 5f and 5h are provided preceding to and succeeding to the variable optical attenuators 4a to 4d.

Figure 11:
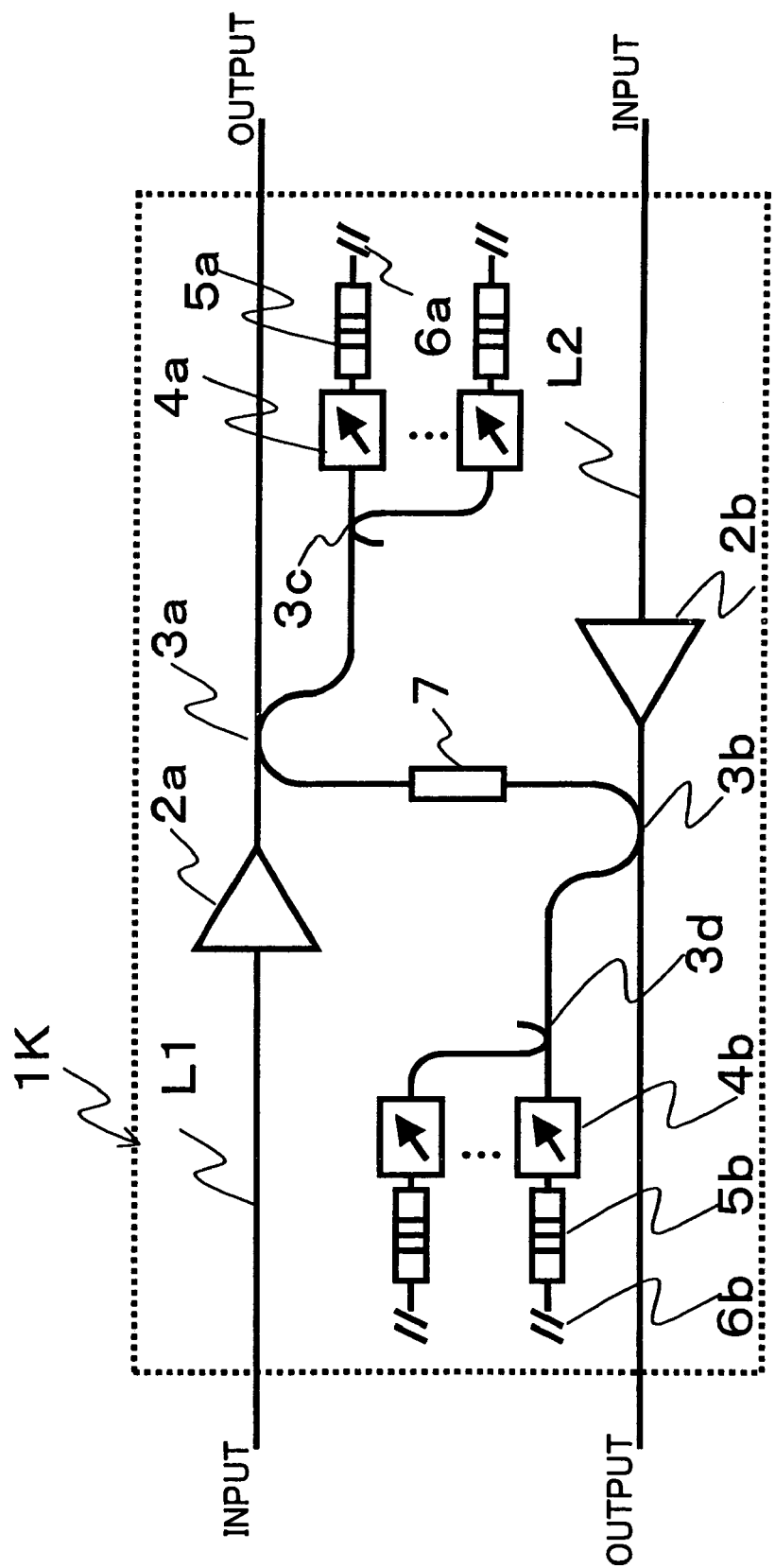
FIG. 11 is a view showing an eleventh embodiment of the optical amplifying and relaying system according to the present invention.

FIG. 11 is a view showing an eleventh embodiment of the optical amplifying and relaying system according to the present invention. In this optical amplifying and relaying system 1K, the light signals led via optical couplers (or branchers) 3a and 3b to the monitoring light signal folding-back lines, are taken out by separator optical couplers (or branchers) 3c and 3d and reflected by a plurality of wavelength selective reflecting means 5a and 5b of different wavelengths to be transmitted to the opposite lines L2 and L1. This structure permits monitoring data of a plurality of optical amplifying and relaying systems.

Figure 12:
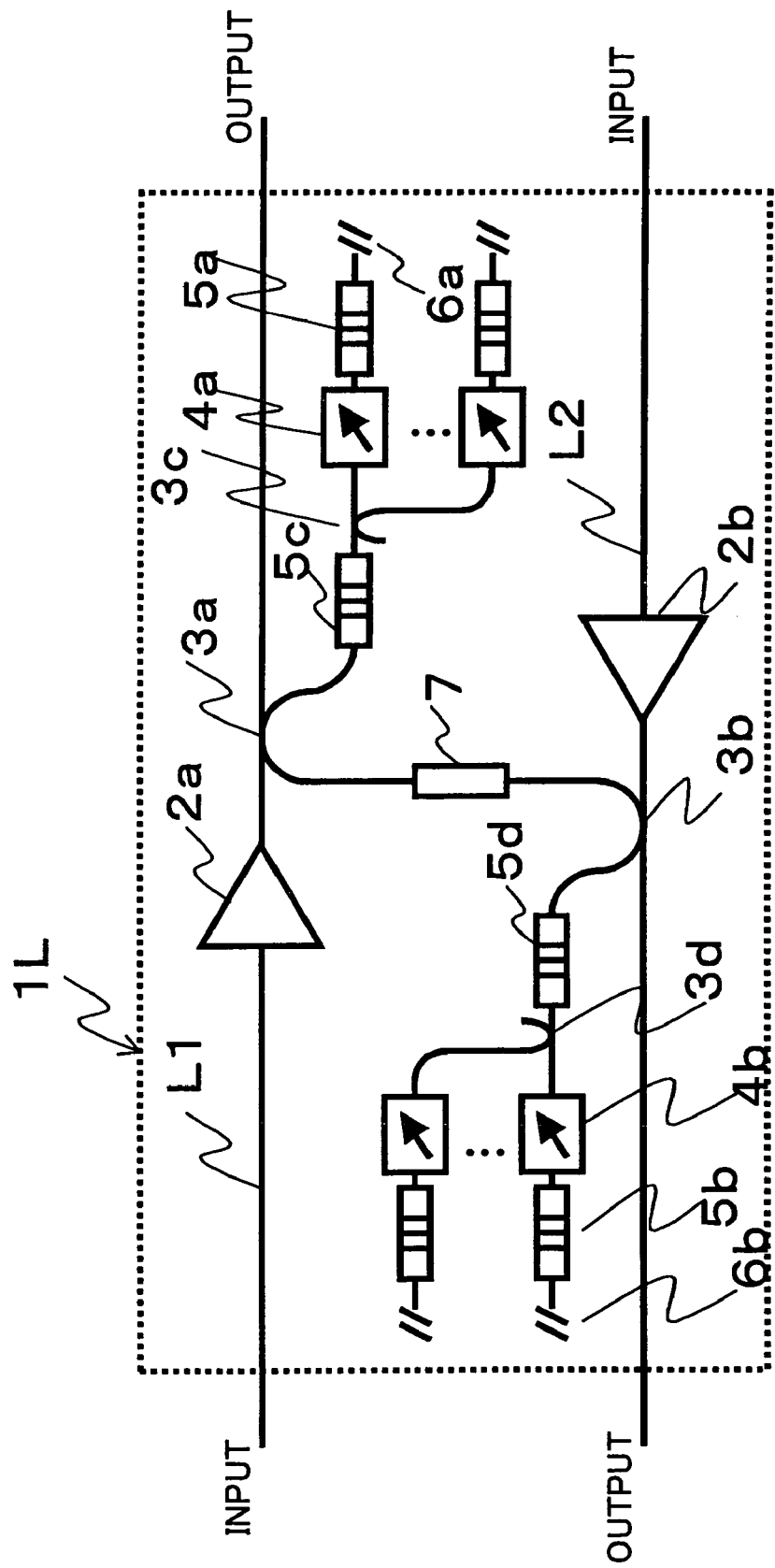
FIG. 12 is a view showing the structure of a twelfth embodiment of the optical amplifying and relaying system according to the present invention.

FIG. 12 is a view showing the structure of a twelfth embodiment of the optical amplifying and relaying system according to the present invention. In this optical amplifying and relaying system 1L, like the FIG. 11 system, the main light signals led via the optical couplers 3a and 3b to the monitoring light signal folding-back lines are taken out by the optical couplers 3c and 3d and transmitted by the wavelength selective reflecting means 5a and 5b of different wavelengths to the opposite lines L2 and L1. This structure thus permits monitoring data of a plurality of optical amplifying and relaying systems. Furthermore, wavelength selective reflecting means 5c and 5d are provided preceding to the optical couplers (or branchers) 3c and 3d, thus permitting highly accurate optical attenuation level monitoring.

Figure 13:
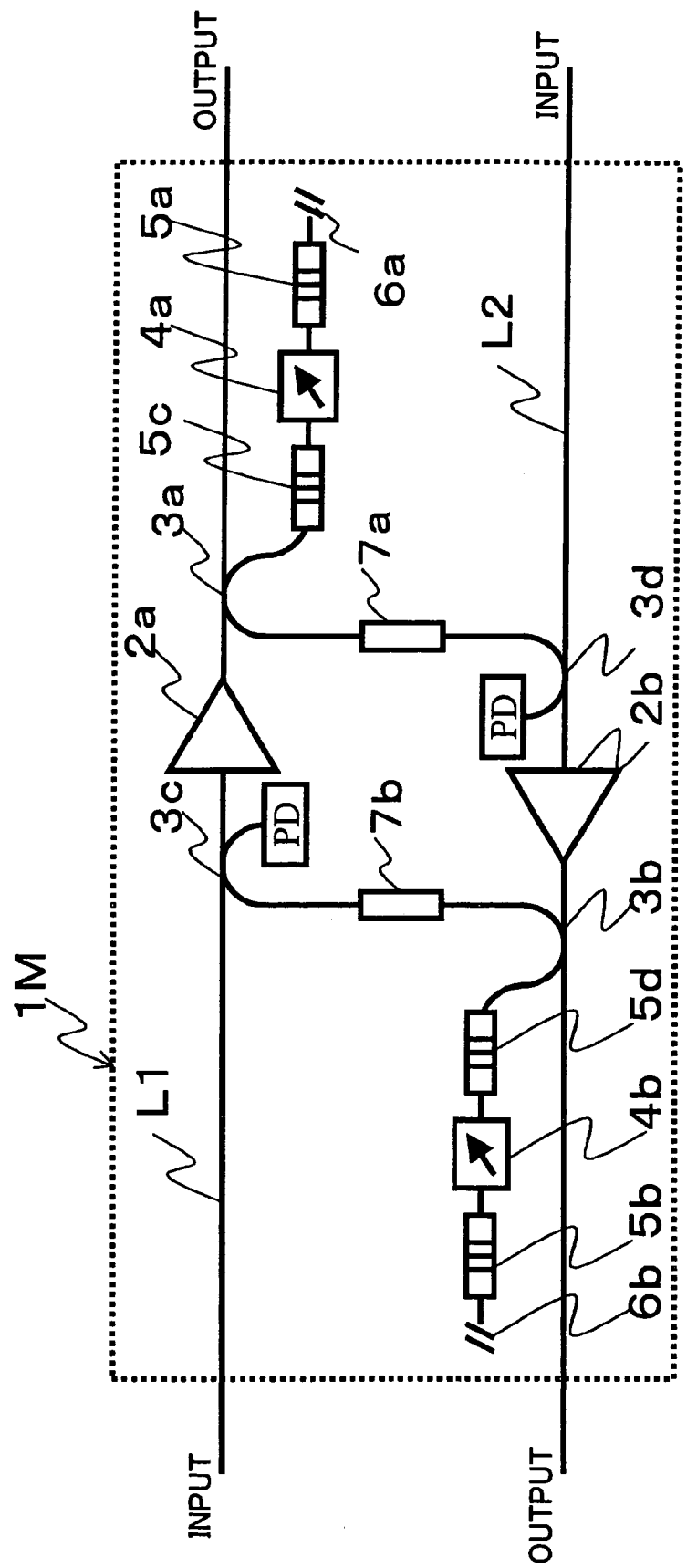
FIG. 13 is a view showing the structure of a thirteenth embodiment of the optical amplifying and relaying system according to the present invention.

FIG. 13 is a view showing the structure of a thirteenth embodiment of the optical amplifying and relaying system according to the present invention. In this optical amplifying and relaying system 1M, the monitoring light signals branched and reflected by optical couplers (or branchers) 3a and 3b on the output side of optical amplifiers 2a and 2b are transmitted by optical couplers 3c and 3d via optical amplifiers 2b and 2a to the opposite optical fiber transmission lines L2 and L1. The system 1M also comprises wavelength selective reflecting means 5a and 5c, and 5b to 5d. Main light signals inputted to the optical amplifiers 2a and 2b are branched by optical couplers (or branchers) on the input side of the optical amplifiers 2a and 2b, and the branched light signals are inputted to PDs (i.e., photo-diodes). The optical attenuation levels of the variable optical attenuators 4a and 4b are controlled based on the output levels of the PDs.

Figure 14:
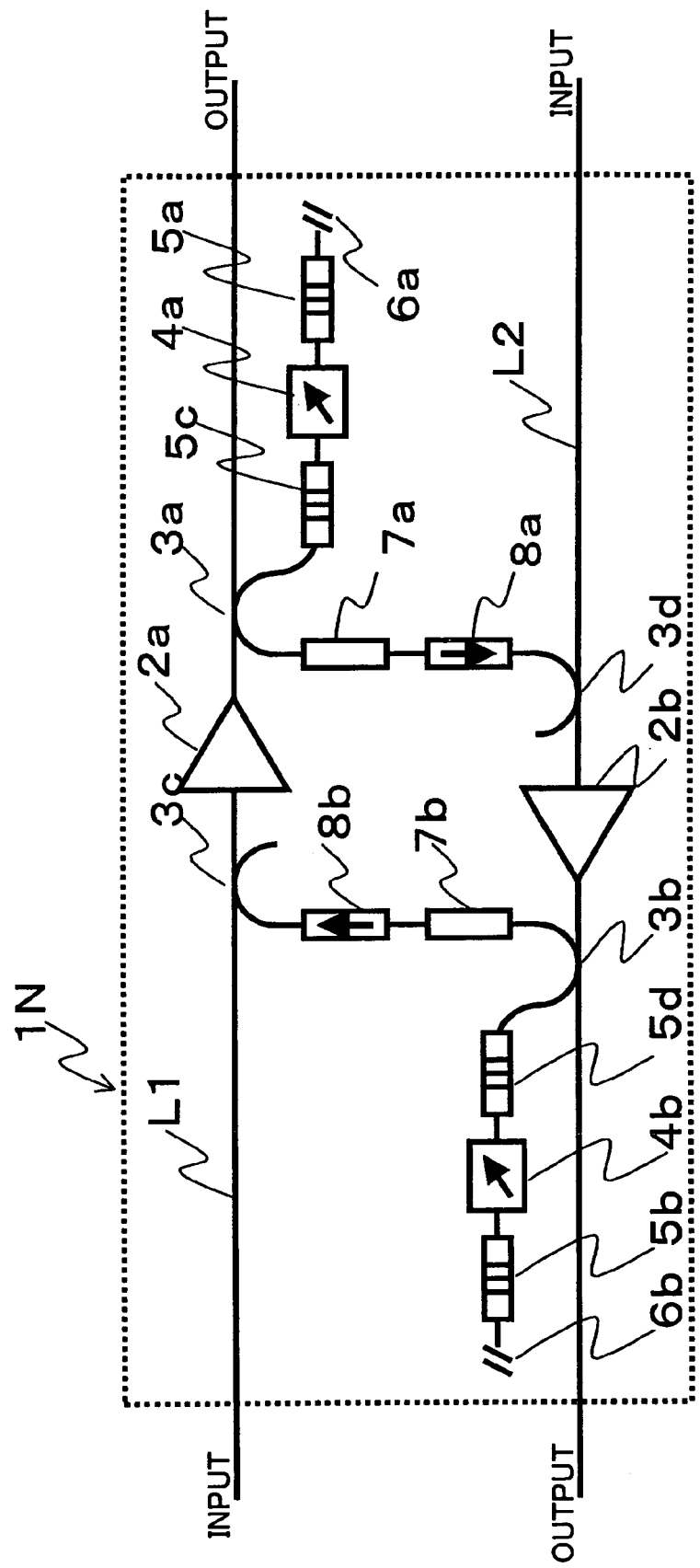
FIG. 14 is a view showing the structure of a fourteenth embodiment of the optical amplifying and relaying system according to the present invention.

FIG. 14 is a view showing the structure of a fourteenth embodiment of the optical amplifying and relaying system according to the present invention. In this optical amplifying and relaying system 1N, optical isolators 8a and 8b are provided as intermediate stages in the monitoring light signal folding-back lines. The wavelength selective reflecting means 5a and 5b adopt optical fiber gratings. The system 1N further uses optical couplers 3a to 3d.

As has been described in the foregoing, with the optical amplifying and relaying system according to the present invention the following practical pronounced effects are obtainable. More specifically, in an optical transmission system comprising an up and a down optical fiber transmission line opposing each other, terminal stations installed at the opposite terminals of these lines and a plurality of optical amplifying and relaying systems cascade connected between the optical fiber transmission lines, variable optical attenuators may be provided in monitoring light signal folding circuits installed in the individual optical amplifiers for easily and highly accurately determining the levels of the monitoring light signals folded back to the opposite lines in dependence on the state of the optical amplifying and relaying system to be monitored. It is further possible to monitor a plurality of data of the optical amplifying and relaying systems.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An optical amplifying and relaying system comprising:
an up and a down optical transmission line opposing each other;
amplifiers each provided on each of the optical transmission lines; and
monitoring light signal folding-back lines connected between the two optical transmission lines and each including an optical coupler for taking out a monitoring light signal led to one optical transmission line and wavelength selective reflecting means for transmitting the monitoring light signal received from the one optical transmission line by folding-back transmission to the opposite optical transmission line,
wherein the optical amplifying and relaying system further comprises variable optical attenuators each provided between each optical coupler and the associated wavelength selective reflecting means.

2. The optical amplifying and relaying system according to claim 1, wherein the optical couplers are each provided on the optical transmission line on the input side of each optical amplifier.

3. An optical amplifying and relaying system comprising:
an up and a down optical transmission line opposing each other;
amplifiers each provided on each of the optical transmission lines; and
monitoring light signal folding-back lines connected between the two optical transmission lines and each including an optical coupler for taking out a monitoring light signal led to one optical transmission line and wavelength selective reflecting means for transmitting the monitoring light signal received from the one optical transmission line by folding-back transmission to the opposite optical transmission line,
wherein variable optical attenuators are each provided between each optical coupler and the associated wavelength selective reflecting means, and the monitoring light signal folding-back lines are each provided on the input side of the optical amplifier on the one optical transmission line.

4. The optical amplifying and relaying system according to claim 3, wherein the wavelength selective reflecting means is provided preceding to and subsequent to the variable optical attenuator.

5. The optical amplifying and relaying system according to claim 3, wherein an optical isolator is provided as an intermediate stage in each monitoring light signal folding-back line, and each wavelength selective reflecting means includes an optical fiber grating.

6. The optical amplifying and relaying system according to claim 3, wherein the wavelength selective reflecting means is disposed at least one of preceding to and subsequent to the variable optical attenuator.

7. The optical amplifying and relaying system according to claim 3, wherein an optical isolator is provided as an intermediate stage in each monitoring light signal folding-back line.

8. The optical amplifying and relaying system according to claim 3, wherein each wavelength selective reflecting means includes an optical fiber grating.

9. The optical amplifying and relaying system according to claim 1, wherein the wavelength selective reflecting means is provided preceding to and subsequent to the variable optical attenuator.

10. The optical amplifying and relaying system according to claim 1, wherein an optical isolator is provided as an intermediate stage in each monitoring light signal folding-back line, and each wavelength selective reflecting means includes an optical fiber grating.

11. The optical amplifying and relaying system according to claim 1, wherein wavelength selective reflecting means is provided at least one of preceding to and subsequent to the variable optical attenuator.

12. The optical amplifying and relaying system according to claim 1, wherein an optical isolator is provided as an intermediate stage in each monitoring light signal folding-back line.

13. The optical amplifying and relaying system according to claim 1, wherein each wavelength selective reflecting means includes an optical fiber grating.

14. The optical amplifying and relaying system according to claim 2, wherein the variable optical attenuators each supply a predetermined attenuation amount to the monitoring light signal based on a state of each optical amplifier.

15. The optical amplifying and relaying system according to claim 3, wherein the variable optical attenuators each supply a predetermined attenuation amount to the monitoring light signal based on a state of each optical amplifier.

* * * * *